J. P. TERRY.
Cultivator.
No. 197,184.  Patented Nov. 13, 1877.
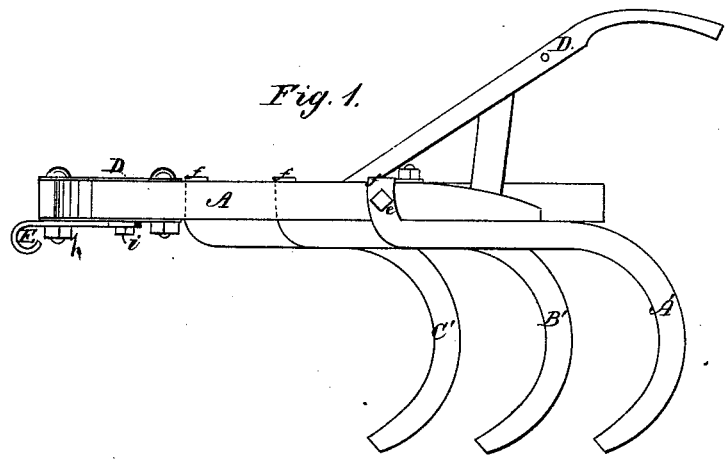
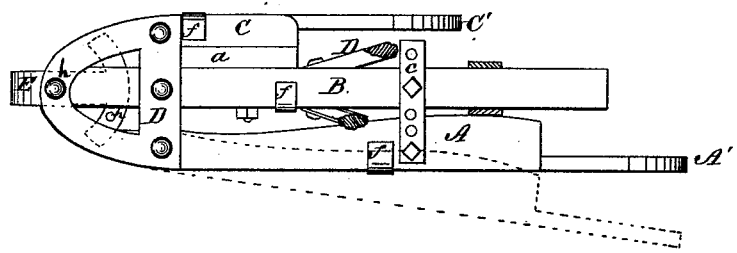
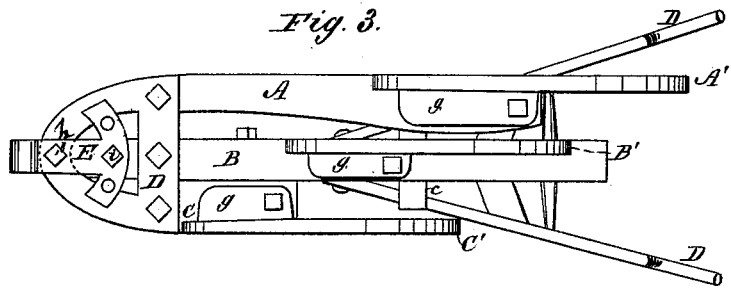
WITNESSES:  INVENTOR:
W. W. Hollingsworth  Joseph P. Terry
John C. Kenion  BY
  ATTORNEYS.

UNITED STATES PATENT OFFICE.

JOSEPH P. TERRY, OF LAKE CITY, FLORIDA.

IMPROVEMENT IN CULTIVATORS.

Specification forming part of Letters Patent No. 197,184, dated November 13, 1877; application filed September 7, 1877.

*To all whom it may concern:*

Be it known that I, JOSEPH P. TERRY, of Lake City, in the county of Columbia and State of Florida, have invented a new and Improved Plow and Cultivator; and I do hereby declare that the following is a full, clear, and exact description the same.

The object of the invention is to provide an improved implement adapted for use both as a breaking-plow and subsoiler; also, as a cultivator for cultivating corn or cotton, and planting and covering seed.

The invention relates particularly to the construction of the plow-standards, and mode of applying them to the beams of the implement, as are shown in accompanying drawings, forming part of this specification, in which—

Figure 1 is a side elevation. Fig. 2 is a top-plan view with the handles in section, and the alternative position of the pivoted adjustable beam shown in dotted lines. Fig. 3 is a bottom-plan view.

A B C represent three plow-beams, composing the frame proper of the implement; and A' B' C', curved plow shanks or standards, which are attached to the respective beams in a manner hereinafter described.

The central beam B is provided with guide-handles D, and the parallel beam C, which is about half the length of the former, is attached to it by screw-bolts, a block, *a*, being interposed. Blocks of different thicknesses may be employed for the purpose of varying the distance between the beams B C and their respective plows or shovels. The beam A is of about the same length as the central beam, and is pivoted near its front end in metal brackets or guide-arms D, which project laterally from the beam B, and also extend across the short beam C. The rear end of the outer beam A is connected to the middle beam by means of a perforated or slotted bar, *c*, by which it is held fixed in any adjustment or horizontal angle to the latter.

The curved iron shanks or standards A' B' C', each of which carries a shovel, share, or other suitable cultivating device, are bent upward at a right angle to the horizontal portion which lies in contact with the under side of the beams, and then laterally at a right angle to the vertical part formed by the first bend. This forms a right-angular arm or sort of double hook, the vertical portion of which lies in a notch or open slot in the side of the beam, while the horizontal part or bend *f* lies flat upon the upper side of the beam, or else enters a notch or slot therein. A screw or screw-bolt passes through the arm *e*, and secures it to the beam.

As an additional means for securing the standards to beams, and also for steadying and preventing torsion of the same, I provide each with a lateral flange, *g*, which lies flat against the under side of the beams, and is bolted thereto, as shown. This construction and mode of attaching the plow-standards to the beams is simple, efficient, and inexpensive, besides enabling them to be detached and changed in position without other labor than the removal of two screws or bolts.

The clevis E consists of a flat T-shaped metal plate, having one of its ends curved to form a hook. The clevis is secured to the under side of beam B by means of a pivot-bolt, *h*, and an adjusting-screw, *i*.

For barring off cotton or covering seed, the central standard B' is detached, (leaving A' and C'.) For subsoiling, the standard C' is removed, and standard A' is attached to beam B, in rear of standard B'. For breaking land, the standards B' and C' are ordinarily used together; but all three standards may be used in some cases.

It is obvious that different shovels or shares will be attached to the standards, according to the work to be done.

The implement is light, of simple and inexpensive construction, easily manipulated, and its parts easily adjusted for different kinds of work.

It is such an implement that an entire crop of corn, cotton, or similar crop can be cultivated without the use of another plow.

What I claim is—

The curved plow-standards having the right-angular arm *e*, the lip *f*, and the flange *g*, in combination with the beams having lateral notches or slots, as shown and described.

JOSEPH P. TERRY.

Witnesses:
GEORGE G. KEEN,
W. M. IVES, Jr.